Sept. 27, 1955  J. E. SOLTIS  2,719,236
ELECTRO-OPTICAL APPARATUS FOR DETERMINING SURFACE AREAS
Filed May 16, 1951
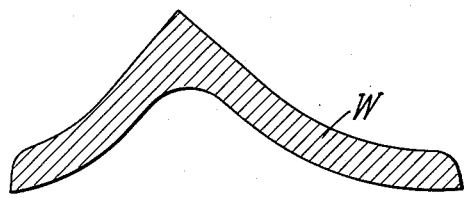
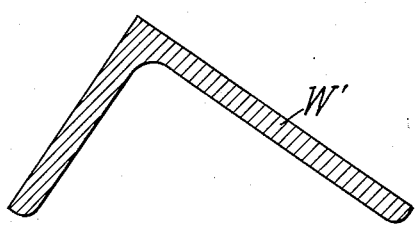
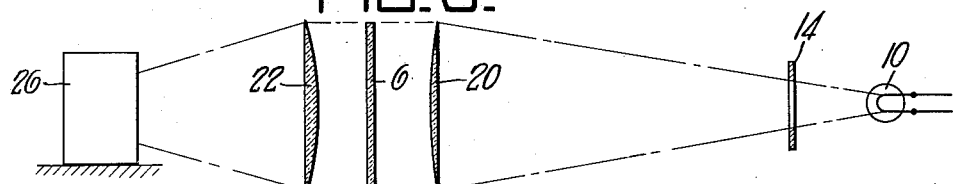
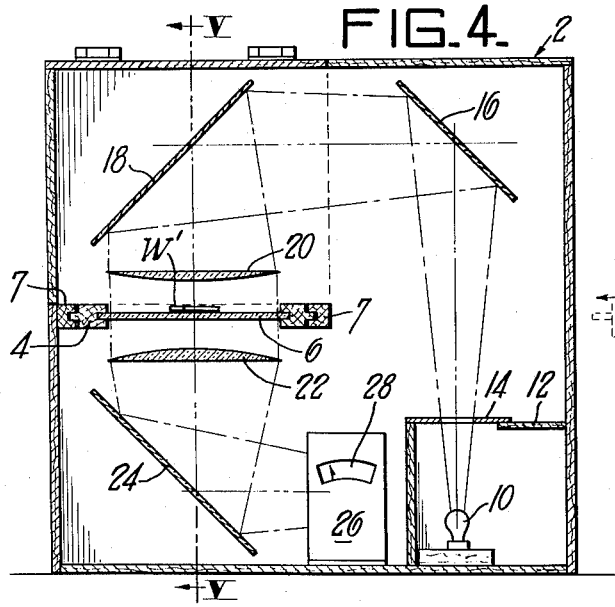
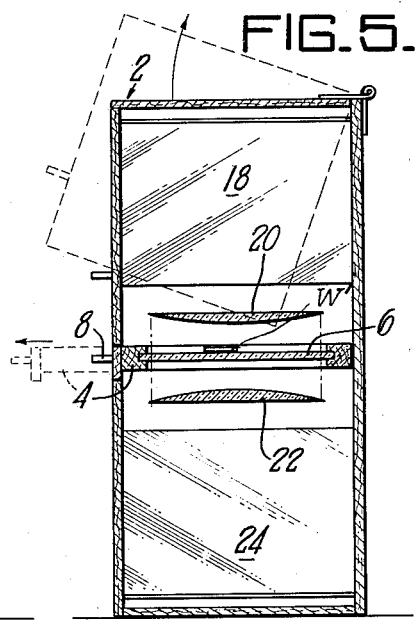
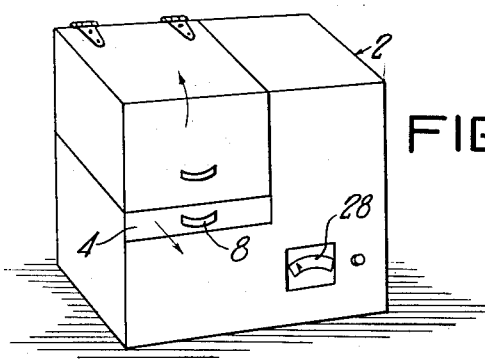
Inventor:
JOHN E. SOLTIS,
by: Donald G. Dalton
his Attorney.

United States Patent Office 2,719,236
Patented Sept. 27, 1955

2,719,236

ELECTRO-OPTICAL APPARATUS FOR DETERMINING SURFACE AREAS

John E. Soltis, Charleroi, Pa., assignor to United States Steel Corporation, a corporation of New Jersey Application May 16, 1951, Serial No. 226,690

1 Claim. (Cl. 250—222)

The present invention relates to an apparatus for determining surface areas and more particularly to an apparatus for determining the areas of irregular shaped planar surfaces by electro-optical means.

In the field of industrial designing it is frequently necessary to determine the areas of irregular shaped objects and surfaces. This is sometimes done by mathematical calculation or by making a pattern or template of the surface to be measured and measuring the perimeter thereof by means of a planimeter. At best, both of these methods are time consuming and susceptible to frequent error.

The problem of accurately determining surface areas of irregular shapes is particularly vexatious, and at the same time very important, in the art of designing rolls for hot rolling shapes such as angles, Z-bars, etc. The preliminary calculations pertaining to the cross sectional area of successive passes, which determine the speeds of the various stands of rolls; the percentage draft to be taken in each pass; and the elongation of the work piece out of each pass in the mill; must all be performed with a high degree of accuracy to insure efficient rolling operations.

The procedure followed preparatory to cutting the rolls for a shape mill is usually as follows: the cross section of the finished product is accurately laid out full size in a drawing, and from this the shape of the preceding passes is laid out within the limits of allowable draft, as determined by inspection. By proceeding sequentially backward on the pass design, the size of the required billet is determined. At this stage, a layout of passes is accurately made for the template maker who then makes a template of each pass opening. The designer must then determine, very accurately, the area of each template in order to beable to calculate the actual draft, elongation, power required at each roll stand, and the position the pass is to be cut in the rolls so that the delivery of the bar from the roll stand can be properly controlled.

Up to the time of my invention the determination of the template areas, which in most cases are very irregular, has been done by means of a planimeter or by mathematical calculation, both of which methods have been found to be tedious, time consuming and subject to frequent error. I propose to eliminate the necessity of using a planimeter or mathematical calculations by providing a method and apparatus whereby the surface areas may be measured directly through the use of a light beam and photo-electric cell in the manner to be described hereinafter.

It is, accordingly, an object of my invention to provide an apparatus whereby the surface area of a planar object may be determined by directing a light beam onto a photo-electric cell and measuring the reduction of current in the photo-electric cell when the object is inserted in the light beam.

This and other objects will become more apparent after referring to the following specification and attached drawings, in which:

Figure 1 is a sectional plan view of a template made of an intermediate pass of a hot rolled shape mill;

Figure 2 is a view similar to Figure 1 showing a template made of the finishing pass of the mill;

Figure 3 is an electro-optical diagram of the invention;

Figure 4 is a vertical sectional view of the apparatus of the invention;

Figure 5 is a sectional view taken on the lines V—V of Figure 4; and

Figure 6 is a perspective view of the cabinet of the invention.

Referring more particularly to the drawings, reference numeral 2 indicates a light-tight cabinet having a drawer 4 slidably disposed therein. The drawer 4 is moved in and out of the cabinet on spaced supports 7 by means of the projecting handle 8. The main body portion or bottom of the drawer consists of a transparent plate glass screen 6 of predetermined surface area. The surface area of the screen 6 is greater than the area of the surfaces to be measured. A conventional light source 10, capable of producing light of controlled intensity, is provided in the one corner of the cabinet 2 within an enclosure 12. The enclosure 12 is provided with a diaphragm opening 14 for directing a beam of light from the light source 10. A mirror 16 is disposed above the diaphragm 14 for reflecting the light beam onto another mirror 18 which is spaced from the mirror 16 and disposed above the glass screen 6. A plano-convex lens 20 is positioned between the mirror 18 and the glass screen 6. Another plano-convex lens 22 is disposed under the screen 6. A mirror 24 is positioned below and spaced from the lens 22 for directing the light beam onto a conventional photo-electric cell 26.

The light beam from the light source 10 is directed through the diaphragm 14 onto the mirror 16 from whence it is reflected at substantially 45 degrees onto the mirror 18. The light beam is reflected from the mirror 18 through the convex lens 20 where the light rays are rendered parallel before passing through the transparent glass screen 6. The light rays are made parallel so as to provide a uniform illumination for the screen which may be measured accurately. The rays of light are concentrated when they pass through the lens 22 onto the mirror 24 from where they are reflected at approximately 90 degrees onto the photo-electric cell 26. As is well known in the art, the light beam directed onto the photo-electric cell sets up a current therein which deflects the needle of its meter 28. Each of the mirrors 16, 18 and 24 may be set at an angle of approximately 45 degrees to the beam of light as shown in Figure 4.

The meter 28 of the photo-electric cell 26 is so calibrated that light passing through the screen 6, unobstructed, causes the needle to be deflected to the maximum point on the scale which is labeled 0 square inches. According to the surface area of the glass screen 6, the midway point on the scale of the photo-electric cell indicates half of the total area of the glass screen 6 in square inches. The resting place of the needle or the point where the needle is positioned, when no light is directed onto the photo-electric cell, is marked with the total surface area of the glass screen 6 in square inches.

In order to determine the surface area of a template W, the drawer 4 is pulled out of the cabinet 2 and the object to be measured is placed on the glass screen 6. The drawer is then slid back into position in the cabinet so that the object to be measured intercepts the beam of light at 90 degrees. The object will thus block out part of the beam passing through the screen 6 and cause a corresponding reduction in the amount of current set up in the photo-electric cell. The meter of the photo-electric cell is then read to obtain the area of the object resting on the glass screen 6. The needle of the photo-electric cell meter will indicate directly how much of the total surface area of the screen 6 has been blocked out by the object W. The blocked out area of the screen is equivalent to the surface area of the object being measured. Thus, the reading shows directly the surface area of the object W.

Figures 1 and 2 are provided to show two examples of the irregular shapes measured by the apparatus of my invention. W' is a template made from the finishing pass of a hot rolled shape mill while W is a template of the second pass preceding the finishing pass.

While one embodiment of my invention has been shown and described it will be apparent that other adaptations and modifications may be made without departing from the scope of the following claim.

I claim:

Apparatus for determining the area of an opaque planar object comprising a light-tight cabinet, a drawer in said cabinet, a transparent screen in said drawer for receiving the object thereon, a light source in said cabinet, a photo-electric cell in said cabinet, and means for directing a beam of light from said light source through said screen onto said photo-electric cell, and lens means adjacent said screen for rendering the rays of said light beam parallel before passing through said screen and concentrating said rays after passing through the screen.

References Cited in the file of this patent

UNITED STATES PATENTS

| | | |
|---|---|---|
| 1,963,128 | Geister | June 19, 1934 |
| 2,098,326 | Wente | Nov. 9, 1937 |
| 2,149,958 | Fox | Mar. 7, 1939 |
| 2,179,000 | Tea | Nov. 7, 1939 |
| 2,346,031 | Jones et al. | Apr. 4, 1944 |
| 2,578,882 | Eash | Dec. 18, 1951 |